United States Patent [19]

Scheibner et al.

[11] Patent Number: 5,417,998
[45] Date of Patent: May 23, 1995

[54] PROCESS FOR THE MANUFACTURE OF A WHOLESOME, NON-PERISHABLE FRUIT PRESERVE

[76] Inventors: Andrea Scheibner; Harald Scheibner, both of Ferdinand-Miller Strasse 1, 82256 Fürstenfeldbruck, Germany

[21] Appl. No.: 253,272

[22] Filed: Jun. 2, 1994

[51] Int. Cl.⁶ .................................. A23L 1/064
[52] U.S. Cl. ................... 426/615; 426/602; 426/626
[58] Field of Search ............. 426/602, 615, 626

[56] References Cited

PUBLICATIONS

Perkins, W. Fannie M. Farmer The Boston Cooking-School Cook Book, 1951. Little, Brown and Co., Boston, p. 783.

*Primary Examiner*—Helen Pratt
*Attorney, Agent, or Firm*—Watson, Cole, Grindle & Watson

[57] ABSTRACT

A process for making a preserve from unripe, fruit which includes a first stage of subjecting the unripe fruit to contact with table salt, a second stage of immersing the fruit in vinegar, and a third stage of immersing the fruit in vegetable oil.

16 Claims, No Drawings

PROCESS FOR THE MANUFACTURE OF A WHOLESOME, NON-PERISHABLE FRUIT PRESERVE

The present invention relates to a process for the manufacture of a wholesome, non-perishable preserve made from fruit, and most particularly, unripe, green tomatoes.

When cultivating the particularly flavorsome and nutritious outdoor tomatoes, the tomato plants usually still bear unripe, green tomatoes at the end of the growth period. Those green tomatoes are digestible with great difficulty. Often they are disposed of as waste and in the best case, composed, although they are sometimes used as a component of piccalilli.

It is, therefore, the purpose of the invention is not only to render unripe, green tomatoes fit for human consumption, but in addition, to create a novel, easily digested and flavorsome product which can be used in a great variety of ways.

It is, of course, already known that e.g., gherkins, chili peppers, small corn cobs and other garden produce can be stored in preserving liquids, e.g., in vinegar water with the addition of seasoning. In the case of known processes, preservation takes place as a result of the effect of heating. Trials have shown that application of this preservation process using the influence of heat, as common with other garden produce, impairs the firmness as well as the taste of green, unripe tomatoes, resulting in a product which is soft, optically unattractive and in all, not very appealing.

By applying a multi-stage preservation process in accordance with the present invention, a product is obtained which is clearly preferred in comparison with green, unripe tomatoes preserved according to conventional methods, and is considered a welcome extension to the range of foods. This is believed due to omitting the effect of extraneous heating applied to the fruit from an outside source during all stages of the preservation process.

SUMMARY OF THE INVENTION

In a fairly basic form, our invention is a process for the manufacture of a wholesome preserve, highly resistant to decomposition and made from unripe, green fruit, such as tomatoes, all without the application of heat from an outside source.

As a preliminary treatment, the fruit is washed and inedible portions removed. Then the fruit is placed between layers of table salt in a container provided with an outlet to drain off liquid that accumulates in the container during contact of the fruit with the salt. After the salt treatment, the fruit is removed from the container and rinsed with water to remove surface salt.

The second stage is immersing the fruit in a solution of vinegar for a period, usually in excess of about 12 hours, after which the fruit is removed from the vinegar solution and allowed to drain. In the third stage we immerse the fruit in a container of a vegetable oil and permit the fruit to remain immersed in the oil for a period in excess of about 30 days. Finally, the fruit is recovered and packaged in individual containers while maintaining it immersed in oil and protected from the atmosphere.

The preferred fruits used are green tomatoes, which may be sliced or comminuted. Other fruit, such as eggplant, have also been found amenable to this process.

There are procedures that constitute improvements over our basic process. Thus, in the salt treatment stage, it has been found preferable to provide the container for the fruit and salt with a cover that can be weighted to apply some pressure against the fruit without rupturing the structure thereof. The cover can be an air-permeable porous cloth. The container may have apertures in its sides and bottom to permit egress of liquids. Also, the height of the layered tomatoes should preferably not exceed 30 cm.

With respect to the vegetable oil immersion stage, the container for the fruit and oil can be vibrated during the immersion. After this treatment has been completed, the oil may be drained off and replaced with fresh oil, or the oil/fruit mix subdivided into portions for consumption or sale. Also, spices may be added to the oil during the immersion treatment.

These and other objects and features of our invention will become more apparent when considered in connection with the following detailed description of the present invention.

DETAILED DESCRIPTION

It is presently the best mode of practicing the present invention to commence with washing the fruit, most preferably tomatoes. A preferred way of implementing the process consists of the tomatoes being cut into slices of between 6 and 9 mm thick at the beginning of the first stage of preservation, the thickness of the slices being dependent upon the consistency of the tomatoes.

During the first stage of preservation, water is drawn from the tomatoes by being placed between layers of coarse-grained table salt. It has proved desirable to add approximately one part by weight of table salt to about five parts by weight of tomatoes during this first stage of preservation. As a result, it has been established that the tomatoes lose about 30% of their weight. The brine which collects during this process continually runs out of the container which is provided with an outlet for liquid. It is preferable that a container pierced with holes on the bottom and sides be used during the first stage of preservation. The removal of the liquid is enhanced by the weight pressing on the cover, which forces this cover downwards, its load being limited so that the tomatoes or tomato slices are not crushed. A load of up to 24 kg/m$^2$ has proved to be satisfactory, depending on the consistency of the tomatoes.

To prevent the lower layers of tomatoes from being crushed by the weight of the tomatoes above them, the total height of the layers of tomatoes should not exceed 30 cm., according to a preferred method of applying the process. According to a further expedient method of implementation, it is preferable that the covering used during the first stage of preservation should consist of a porous, air-permeable cloth.

When the tomatoes or tomato slices have been through the first stage of preservation—for about 24 hours at 14° to 20° C.—they are rinsed briefly with water and then allowed to drain well before entering the second stage of preservation, during which they are exposed to the effect of vinegar. The vinegar is to some extent absorbed by the tomatoes, so that after the end of the second stage of preservation these show approximately a 5% increase in weight. Subsequent to this second stage of preservation, the tomatoes can already be stored for several days without becoming mouldy. It is recommended that during the second stage of preservation, some 20 liters of vinegar solution be added to 10 kg of tomatoes. The solution may be any desirable concentration, e.g., 3% by weight, with a preferred range of 3 to 6%, and immersion is preferable for about 24 hours, although 12 hours is usually satisfactory.

In order to round out the flavor and provide the final preserving effect, the tomatoes undergo a third stage of preservation. According to a preferred recipe, the seasoning added for the third stage of preservation per 10 kg of tomatoes comprises 0.20 kg chopped parsley, 0.02 kg basil, 0.05 kg whole peppercorns, 0.10 kg chopped garlic cloves and one small, chopped, dried chili, seeded.

To prevent the formation of air bubbles in the oil or to remove any which have appeared, the ripening container is shaken in accordance with a preferred method of conducting the process, at the beginning of the third stage of preservation while and/or after adding the vegetable oil.

After the third stage of preservation, the tomatoes can be packed into glass jars together with the oil in which they ripened and the jars sealed. One method of carrying out this process to be particularly recommended consists of draining off the oil used during ripening at the end of the third stage of preservation and storing the tomatoes in freshly-added vegetable oil. The oil used for ripening can then be exploited as a separate product, e.g., as a dressing. While vegetable oils such as corn oil, soybean oil and sunflower oil are preferred, olive oil is less preferred because it has been found to be more acidic than desired.

As the end product of our process, one obtains palatable, tart, well-seasoned fruit, e.g., tomatoes or tomato pieces, which are firm to eat and which can for example be consumed as hors d'oeuvre, as a pizza topping or warmed as a vegetable. The keeping quality depends on the keeping quality of the oil in which they are stored after the third stage of preservation. All stages are usually carried out at ambient temperatures or less, i.e., about 14° to 20° C.

While the present invention has been described with reference to a specific, preferred embodiment thereof, those of skill in this art will recognize that certain variations and modifications thereof will be readily apparent. As to all such obvious changes, we desire that they be included within the scope of our invention, which is to be limited only by the scope, including equivalents, of the following, appended claims.

We claim:

1. A process for the manufacture of a wholesome fruit preserve resistant to decomposition made from unripe, fruit comprising:
   washing fruit and removing inedible portions thereof;
   placing the fruit in contact with solid table salt in a container provided with an outlet to drain off liquid that accumulates in the container during contact of the fruit with the salt;
   removing the fruit from the container and rinsing it with water to remove surface salt;
   immersing the fruit in a weak solution of vinegar for a period in excess of about 12 hours;
   removing the fruit from the vinegar solution and allowing the fruit to drain;
   immersing the fruit in vegetable oil and permitting the fruit to remain immersed in the oil for a period in excess of about 30 days, and
   thereafter recovering the fruit and packaging it while maintaining it immersed in oil, said process being carried out in the substantial absence of the application of heat from an outside source.

2. A process as claimed in claim 1, in which said fruit are green and unripe.

3. A process as claimed in claim 2, in which said fruit are sliced green tomatoes.

4. A process as claimed in claim 1, in which said fruit are sliced or comminuted eggplant.

5. A process as claimed in claim 1, in which said step where the fruit is immersed in vegetable oil is carried out in the presence of spices.

6. A process as claimed in claim 5, in which said fruit and vegetable oil are shaken at intervals during immersion of the fruit in the oil.

7. A process as claimed in claim 1, in which, after immersion of the fruit in the oil has been completed, the oil is drained off to be sold as a separate product and the ripened fruit is stored in freshly added oil.

8. A process as claimed in claim 1, which is carried out at or below ambient temperature.

9. A process as claimed in claim 1, in which said solid table salt is granular in form.

10. A process for the manufacture of a wholesome, preserve resistant to decomposition and made from unripe, green fruit, comprising:
    washing fruit and removing inedible portions thereof;
    placing the fruit in a container between layers of solid table salt, said container being provided with a outlet to drain off liquid and having a cover that can be depressed against the fruit to apply pressure to the fruit without rupturing the structure of the fruit;
    removing the fruit from the container and rinsing it with water to remove surface salt;
    immersing the fruit in a weak solution of vinegar for a period in excess of about 12 hours;
    removing the fruit from the vinegar solution and allowing the fruit to drain;
    immersing the fruit in a container containing a vegetable oil and permitting the fruit to remain immersed in the oil for a period in excess of about 30 days, and
    thereafter recovering the fruit and packaging it in individual containers while maintaining it immersed in oil, said process being carried out in the substantial absence of the application of heat from an outside source.

11. A process as claimed in claim 10, in which the ratio of table salt to fruit is approximately five parts of fruit to one part of table salt.

12. A process as claimed in claim 10, in which the total height of the layered tomatoes does not exceed approximately 30 cm.

13. A process as claimed in claim 10, in which the cover of the container for the fruit and table salt is formed from an air-permeable, porous cloth.

14. A process as claimed in claim 10, in which pressure is applied to said cover to assist in dispelling liquid from said table salt/fruit container.

15. A process as claimed in claim 10, in which said fruit/table salt container has apertures in its bottom and sides to permit drainage of liquid therethrough.

16. A process as claimed in claim 10, in which said solid table salt is coarse-grained.

* * * * *